US006995685B2

(12) United States Patent
Randall

(10) Patent No.: US 6,995,685 B2
(45) Date of Patent: Feb. 7, 2006

(54) UTILITY METER POWER ARRANGEMENTS AND METHODS

(75) Inventor: Bruce E. Randall, Rock Hill, SC (US)

(73) Assignee: Landis+Gyr, Inc., Lafayette, IN (US)

(*) Notice: Subject to any disclaimer, the term of this patent is extended or adjusted under 35 U.S.C. 154(b) by 488 days.

(21) Appl. No.: 10/256,242

(22) Filed: Sep. 25, 2002

(65) Prior Publication Data

US 2003/0087615 A1 May 8, 2003

Related U.S. Application Data

(60) Provisional application No. 60/324,778, filed on Sep. 25, 2001.

(51) Int. Cl.
*G08B 23/00* (2006.01)
*G08C 19/12* (2006.01)

(52) U.S. Cl. .......................... 340/870.39; 340/870.02; 340/870.17

(58) Field of Classification Search ........... 340/870.39, 340/870.02, 870.17; 702/62
See application file for complete search history.

(56) References Cited

U.S. PATENT DOCUMENTS

| 4,316,262 A | | 2/1982 | Mizuta et al. |
| 4,427,968 A | * | 1/1984 | York ..................... 340/310.07 |
| 4,940,976 A | * | 7/1990 | Gastouniotis et al. ... 340/870.02 |
| 5,150,954 A | * | 9/1992 | Hoff ........................ 340/7.34 |
| 5,251,179 A | | 10/1993 | Wittman |
| 5,426,561 A | * | 6/1995 | Yen et al. .................... 361/502 |
| 5,446,453 A | | 8/1995 | Nagamoto et al. |
| 5,471,137 A | | 11/1995 | Briese et al. |
| 5,544,089 A | | 8/1996 | Hemminger et al. |
| 5,757,172 A | | 5/1998 | Hunsdorf et al. |
| 5,969,436 A | | 10/1999 | Chalasani et al. |
| 6,112,158 A | | 8/2000 | Bond et al. |
| 6,374,101 B1 | * | 4/2002 | Gelbien ..................... 455/420 |
| 6,459,175 B1 | | 10/2002 | Potega |
| 6,535,859 B1 | * | 3/2003 | Yablonowski et al. ...... 705/412 |
| 6,665,620 B1 | | 12/2003 | Burns et al. |
| 6,819,226 B2 | | 11/2004 | Randall |
| 2002/0014880 A1 | | 2/2002 | McAndrews |
| 2002/0109607 A1 | | 8/2002 | Cumeralto et al. |

* cited by examiner

*Primary Examiner*—Michael Horabik
*Assistant Examiner*—Kimberly Jenkins
(74) *Attorney, Agent, or Firm*—Maginot Moore & Beck

(57) ABSTRACT

An arrangement for providing power in a utility meter includes a power conversion circuit and a bank of capacitors. The power conversion circuit is operable to provide power to metering circuitry within the utility meter, the power conversion circuit having a maximum output current. The bank of capacitors is operably coupled to a power supply input of the radio frequency transmitter, the bank of capacitors configured to provide current in excess of the maximum output current during transmission by the radio frequency transmitter to supply power to the radio frequency transmitter.

21 Claims, 8 Drawing Sheets

UTILITY METER POWER ARRANGEMENTS AND METHODS

This application claims the benefit of U.S. Provisional Patent Application Ser. No. 60/324,778, filed Sep. 25, 2001, which is incorporated herein by reference.

FIELD OF THE INVENTION

The present invention relates generally to utility meters, and more particularly, to arrangements and methods for providing power to circuits within a utility meter.

BACKGROUND OF THE INVENTION

Utility meters, such as electricity meters, track the usage of utility commodities, for example, electricity. In the past, utility personnel physically observed meter data on mechanical counters or electronic displays. Because meters are typically located at the facility of the utility customer, such methods of meter reading are labor intensive and expensive.

Various types of remote meter reporting systems have been proposed and/or implemented. In one proposal, a wireless radio is employed. Wireless radio technology provides the advantage of not requiring a separate land-based communication line connection to the meter.

One problem with wireless radio communications in utility meters arises from the high power requirements of such radios. For example, wireless paging technology can require in excess of one amp of current at approximately eight to ten volts. This power requirement far exceeds the power requirement for the remainder of the meter circuitry. Typically, even more advanced polyphase electric utility meters only require substantially less than one amp of current. As a consequence, if the power supply in a utility meter is designed to accommodate wireless pager transmitters, the power supply must be drastically different, and generally much larger, then the power supply in the same utility meter without the transmitter.

The larger capacity power supply both occupies additional space within the meter and has increased cost. Because utility meter is only required to perform RF transmissions a very small fraction of the overall operating time of the meter, such additional power generating capacity goes unused for a substantial majority of the time. As a consequence, the relatively infrequent need for additional power does not necessarily justify the additional size, weight and cost issues that arise from the use of a large capacity power supply.

To address this issue, it is possible to employ a temporary or supplemental power source in the meter. For example, one or more batteries may be used to supplement the power supply output during transmission operations by the remote transmitter. In such a case, the power supply may be of a design suitable for the remaining meter circuitry. When extra power is needed for transmission, the extra power is provided by the batteries.

The reliance on batteries however, has drawbacks. As an initial matter, batteries used as supplemental power sources must necessarily be rechargeable batteries to be of any practical use. Indeed, the use of non-rechargeable batteries requiring frequent replacement would defeat the very purpose of implementing radio frequency transmission to reduce the need for service visits to the meter. With regard to rechargeable batteries, nickel-metal hydride and lithium-ion batteries have been used in many applications, for example, in portable telephones and computers. However, such batteries are not particularly well-suited to the particular needs of a utility meter. For example, such batteries require relatively complex charging circuits, which would tend to negate the cost-savings of using the temporary power source. Moreover, all rechargeable batteries have a limited temperature range. Some rechargeable batteries lose their ability to hold a charge if exposed to out of range temperatures for an extended period.

Accordingly, a need exists for a method of providing supplemental, temporary power to a transmitter and possibly other circuits in a utility meter that overcomes the drawbacks associated with the use of rechargeable batteries.

SUMMARY OF THE INVENTION

The present invention addresses the above need, as well as others, by providing an arrangement and/or method for supplying power to a radio in a utility meter that includes one or more capacitors that store power for burst transmission applications. Preferably, the capacitors comprise double-layer capacitors incorporating metal-carbon electrodes and a non-aqueous electrolytic solution. Alternatively, electrolytic capacitors may be use, although at a disadvantage. In any event, the capacitors are charged between burst transmissions of the radio device.

One embodiment of the invention is an arrangement for providing power in a utility meter includes a power conversion circuit and a bank of capacitors. The power conversion circuit is operable to provide power to metering circuitry within the utility meter, the power conversion circuit having a maximum output current. The bank of capacitors is operably coupled to a power supply input of the radio frequency transmitter, the bank of capacitors configured to provide current in excess of the maximum output current during transmission by the radio frequency transmitter to supply power to the radio frequency transmitter.

In another aspect of the present invention, the arrangement includes a bank of one or more energy storage devices and a temperature controlled heater element. The heater element provides heat to the energy storage devices to bring the ambient temperature to a level sufficient to enhance operation of the energy storage devices. The energy storage devices may be capacitors as described above, but need not be.

In still another aspect of the present invention, a radio transmission device is powered by one or more energy storage devices that have a temperature-dependent characteristic. The radio transmission device includes a temperature sensor and a circuit that disables transmission if the detected temperature is above or below a particular threshold.

Other aspects of the invention will become readily apparent to those of ordinary skill in the art by reference to the following detailed description and accompanying drawings.

DETAILED DESCRIPTION

Figure 1:
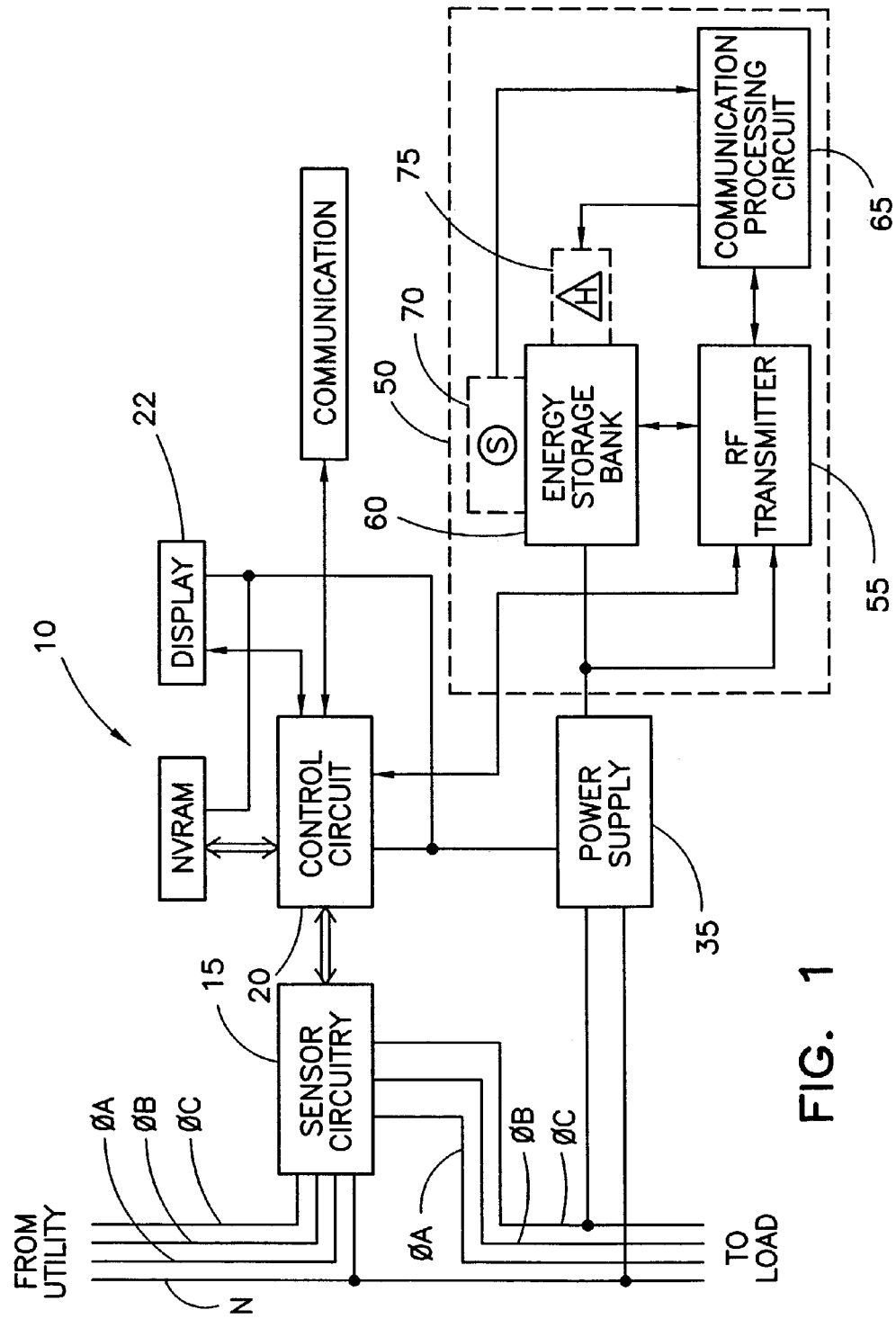
FIG. 1 shows a schematic block diagram of a utility meter that incorporates the RF power arrangement according to the present invention.

FIG. 1 shows a block diagram of an electricity meter 10 that incorporates a power arrangement according to the present invention. In general, the meter 10 includes a sensor portion or sensor circuit 15, a primary power supply 35, a measurement portion or measurement circuit 20, a control circuit 30, a communication circuit 45, a radio frequency communication ("RF") module 50.

The sensor circuit 15 is operably coupled to a plurality of utility power lines including a phase A power line φA, a phase B power line φB, a phase C power line φC, and a neutral line N. The plurality of utility power lines φA, φB, φC, and N connect to an electrical utility, not shown, and provide power from the utility to a load, not shown. The power or energy consumed by the load is metered by the meter 10. The load may suitably be the electrical system of a residential facility, industrial facility, commercial facility, or the like. It is noted that the exemplary embodiment described herein is installed in what is referred to as a three phase power configuration, consisting of three phases of power lines φA, φB, and φC. The present invention, however, is in no way limited to use in any particular power configuration, and those of ordinary skill in the art may readily modify the meter 10 for use in single phase and other power configurations.

The sensor circuit 15 includes circuitry for generating energy consumption signals indicative of the power provided to the load on the power lines φA, φB, φC, and N. To this end, the sensor circuit 15 may include a plurality of current sensing devices, such as current transformers, current shunts, embedded coils or the like, which generate energy consumption signals that are representative of the current waveform on each of the lines φA, φB, and φC. Likewise, the sensor circuit 15 may further include a plurality of voltage sensing devices, such as voltage divider circuits, which generate further energy consumption signals that are representative of the voltage waveform on each of the lines φA, φB, and φC.

The sensor circuit 15 is operably connected to provide the energy consumption signals to the measurement circuit 20. The measurement circuit 20 is a device or circuit that is operable to generate metering data from the energy consumption signals. Metering data may include, among other things, a number representative of accumulated energy consumption in the form of watt-hrs, VA-hrs, or VAR-hrs. Metering data may also include constituent values such as Vrms, Irms or power factor information. The metering data may be used by the utility for, among other things, billing and demand tracking purposes.

To this end, the measurement circuit 20 may include one or more processors and associated circuitry. Such measurement and control circuits for use in utility meters are well known. In many cases, the measurement circuit 20 involves a combination of a digital signal processor and a microprocessor or microcontroller. Examples of such a circuit include the combination of the conversion circuit and microcontroller in U.S. Pat. No. 6,112,158, the front end CPU 44 and register CPU 50 of U.S. Pat. No. 5,471,137 to Briese et al., and the A/D and DSP 14 and microcontroller 16 of U.S. Pat. No. 5,544,089 to Hemminger et al., all of which are incorporated herein by reference.

The measurement circuit 20 is preferably coupled to a display 22 that is operable to display metering information. The structure and operation of such displays would be known to those of ordinary skill in the art.

The primary power supply 35 is a circuit that obtains primary electrical power from a primary power source and generates primary bias power for the meter 10. In the embodiment described herein, the primary power supply 35 may suitably be connected to power line φC to obtain primary electrical power therefrom. The primary power supply 35 provides the primary bias power to one or more digital circuits within the meter 10, such as, for example, the measurement circuit 20 and the display 22. The primary power supply 35 furthermore provides primary bias power to circuits in the RF circuit 50.

The primary power supply 35 is configured to convert the AC input from the power line φC to 5–10 volt DC voltage bias power. It will be appreciated that, in the alternative, the primary power supply 35 may suitably be connected to receive primary electrical power from other power lines, all of the power lines, or one or more alternative power sources.

The components of the power supply 35 will typically exhibit a maximum practical output current. The components of the power supply 35 are chosen such that the maximum output current is greater than the power required to perform the operations of the meter 10 except in circumstances in which the RF circuit 50 is effecting a transmission of information. Because the transmission by the RF circuit 50 requires much more power than ordinary metering operations, and because RF transmission occurs relatively infrequently and for relatively short durations of time, the power supply 35 is typically not designed to have the capacity to power RF transmission because such capacity would greater increase the size and cost of the components of the power supply 35. Instead, the meter 10 employs an auxiliary power source for RF transmission as will be discussed further below.

In a preferred embodiment, the primary power supply 35 is a switched mode power supply, which is well known in the art. The primary power supply 35 is preferably designed to have a maximum current output of approximately 200–300 milliamps. Switched mode power supplies having such capabilities are well known in the art.

The RF circuit 50 in the embodiment described herein includes an RF transmitter 55, an energy storage circuit 60, a processing circuitry 65, a temperature sensor 70, and a heating element 75. The RF transmitter 55 is a device that is operable to communicate through a wireless connection, not shown, to a remote device such as a billing center or service center. To this end, the RF transmitter 55 may communicate via radio frequency signals to a landline communication network, which then communicates with the final destination. The RF transmitter 55 may be employed to communicate metering information received either directly or indirectly from the measurement circuit 20. In this manner, remote meter reporting may be achieved.

The RF transmitter 55 may suitably be a two-way pager radio. The RF transmitter 55 preferably both receives and transmits information via RF signals to a pager radio network that employs any suitable means to communicate signals with the remote destination of the signals. Other RF circuits may likewise be employed, including those suitable for use with a cellular telephone network, a PCS network, or other wireless network.

The energy storage device 60 is a circuit that is operable to provide current to the RF transmitter 55 during transmission by the RF transmitter 55. The energy storage device 60 is configured to provide such current only for temporary transmission times, and recharges between transmission transactions. The energy storage device 60 is configured to provide, either alone or as supplemented with power from the primary power supply 35, sufficient power to the RF transmitter 55 to allow the RF transmitter 55 to sustain transmission on a temporary basis. To this end, the energy storage device 60 is operable to provide current in excess of the maximum output current of the power supply 35, and preferably several times that maximum output current.

The energy storage device 60 is operably coupled to a source of power from which the energy storage device 60 charges between transmission transactions. In the exemplary embodiment described herein, the energy storage device 60 is operably coupled to the primary power supply 35 to receive charging power therefrom.

In the exemplary embodiment described herein, the energy storage device 60 comprises a bank of one or more capacitors. As will be discussed below in further detail, the preferred capacitors are ultracapacitors of the type available from Maxwell Technologies, of San Diego Calif. Alternatively, the energy storage device 60 may be one or more rechargeable batteries. Lead-acid batteries have favorable characteristics compared to lithium-ion and nickel-metal-hydride batteries. In particular, lead-acid batteries accept a float charge well and has a decent temperature range of operation. The energy storage device 60 may also comprise a bank of electrolytic capacitors, but may require additional voltage conversion.

Regardless of the type of energy storage device 60 employed, it is often advantageous to control the temperature range in which the energy storage device 60 operates to provide power to the RF transmitter 55. As a consequence, in the embodiment described herein, the RF circuit 50 operates to inhibit operation of the RF transmitter 55 if the temperature is outside a predetermined range. Moreover, the RF circuit 50 also operates to heat the energy storage device 60 if the temperature is below a predetermined point.

To this end, the temperature sensor 70 is disposed proximate the energy storage device 60 in order to obtain temperature measurements in the vicinity of the energy storage device. While any ambient temperature within the meter 10 may provide sufficient information regarding temperature of the energy storage device 60, it is preferable that the sensor be physically located adjacent to the energy storage device 60 because the temperature could vary somewhat in different portions of the meter 10.

In any event, the temperature sensor 70 is operable to generate a temperature output signal having temperature information therein. The processing circuitry 65 is operably coupled to receive the temperature information either from the temperature output signal, or indirectly from the temperature output signal. The processing circuitry 65 is operable to inhibit operation of the RF transmitter 55 based at least in part on the temperature information. Typically, the processing circuitry 65 inhibits operation of the RF transmitter 55 when the temperature is below a threshold, the threshold based on the operating temperature of the energy storage device 60. Thus, for example, if ultracapacitors are employed as the energy storage device 60, then the threshold temperature would be somewhere above −30 C because the operating temperature of such devices is −30 C to +85 C. If lead acid batteries are use, then the threshold temperature would also be somewhere above −30 C because the operating temperature of such batteries is −30 C to +70 C.

The processing circuitry 65 is configured to inhibit operation of the RF transmitter 55 below the threshold temperature in order to prevent faulty operation and/or damage to either the RF transmitter 55 or the energy storage device 60. In particular, if the RF transmitter 55 is otherwise going to transmit metering data either through a scheduled transmission or in response to a request received by the RF transmitter 55, the processing circuit 65 causes the transmission to be inhibited. To this end, the processing circuit 65 may provide a signal that disables the RF transmitter 55. Other methods of inhibiting or preventing transmission may be employed.

In the exemplary embodiment described herein, the RF circuit 50 further includes a heating element 75 configured to alter the temperature of the energy storage circuit 60. In particular, as discussed above, operation of the energy storage circuit 60 at temperatures below a certain value is either unreliable or potentially disruptive. Accordingly, the heating element 75 is disposed proximate the energy storage circuit 60 and is operable to raise the ambient temperature in the vicinity of the energy storage circuit 60. To this end, the heating element 75 may include one or more resistors that dissipate energy in the form of heat.

To this end, the processing circuitry 65 is also configured to selectively activate the heating element 75 based on the temperature information received from the temperature sensor 70. In particular, when the temperature information indicates that the temperature in the proximity of the energy storage element 60 falls below a particular threshold, the processing circuit 65 causes the heating element 75 to be activated. The processing circuitry 65 may subsequently deactivate the heating element 75 when the temperature information indicates that the temperature is above another predetermined threshold, or alternatively after a predetermined period of time.

Figure 2:
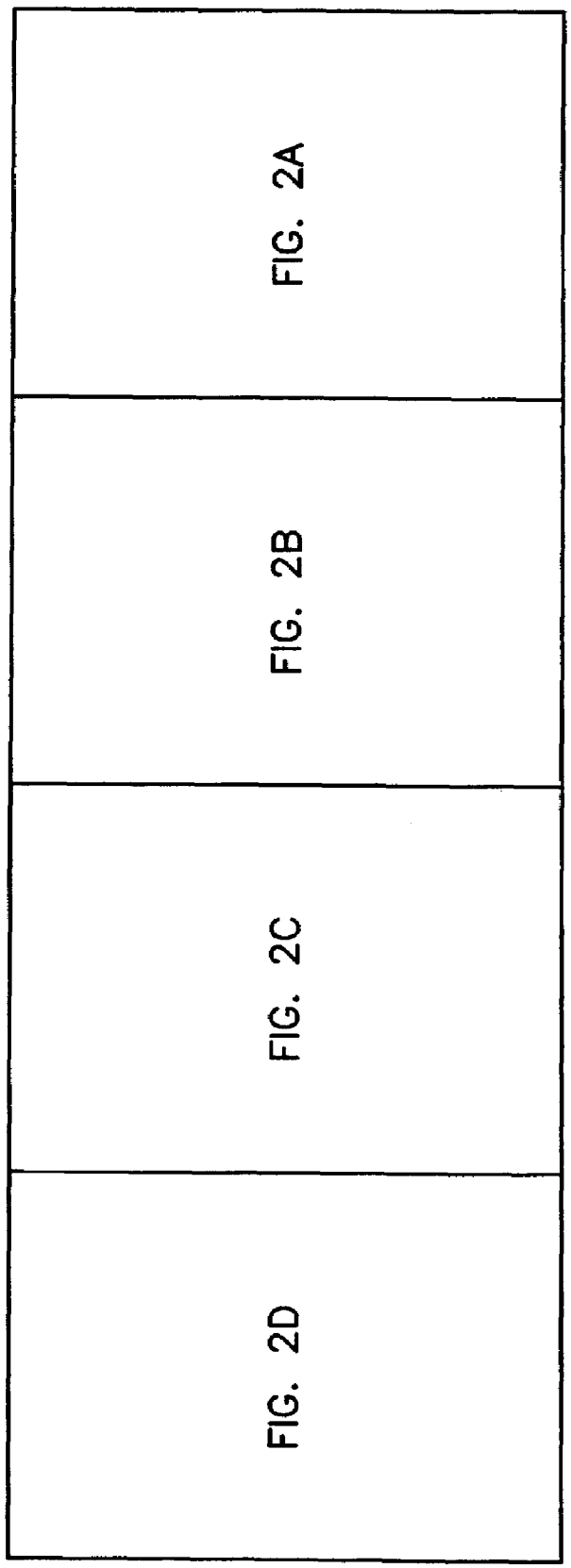
FIG. 2 shows a schematic diagram of an exemplary RF module according to the invention.
Figure 2A:
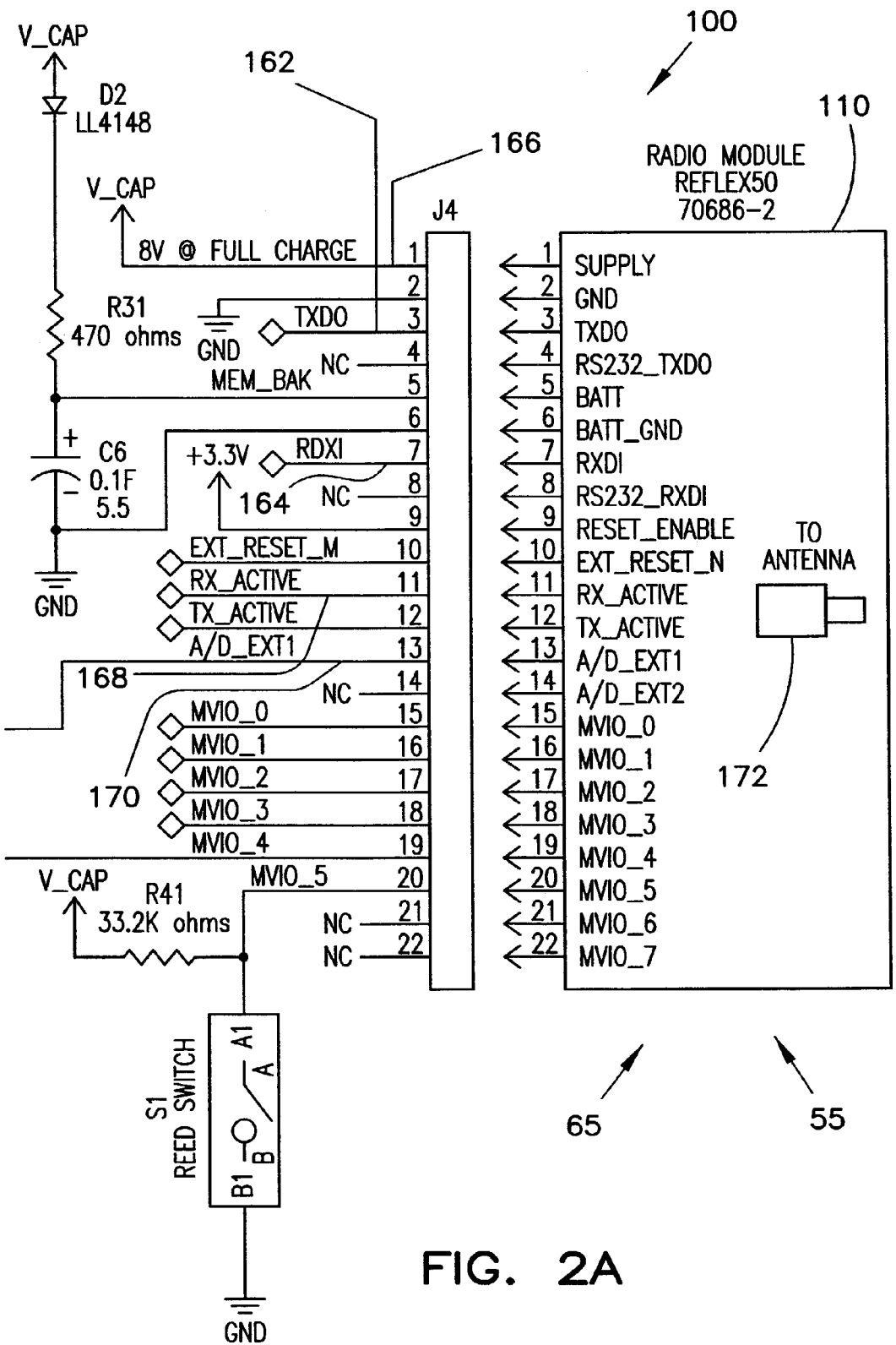
Figure 2B:
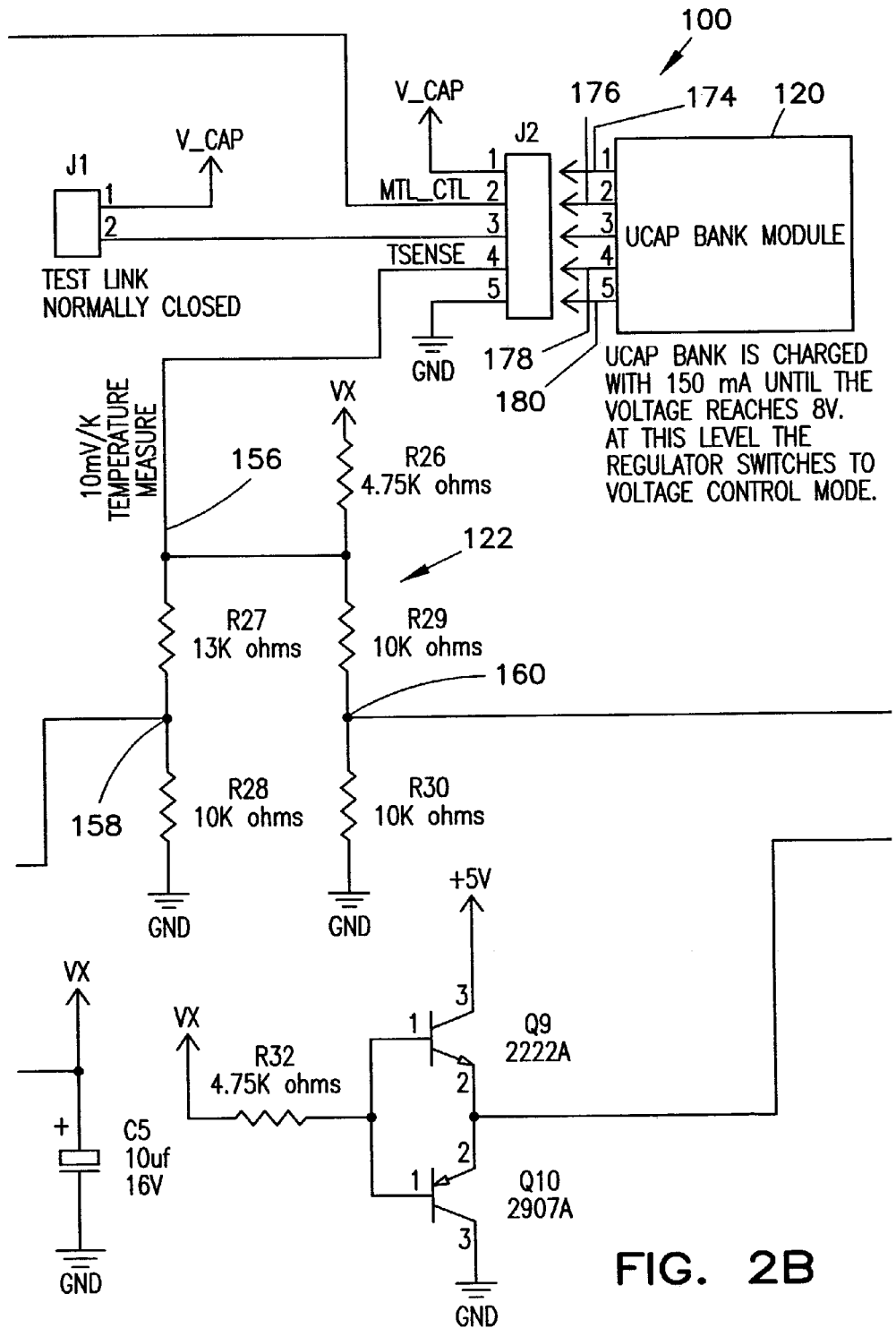
Figure 2C:
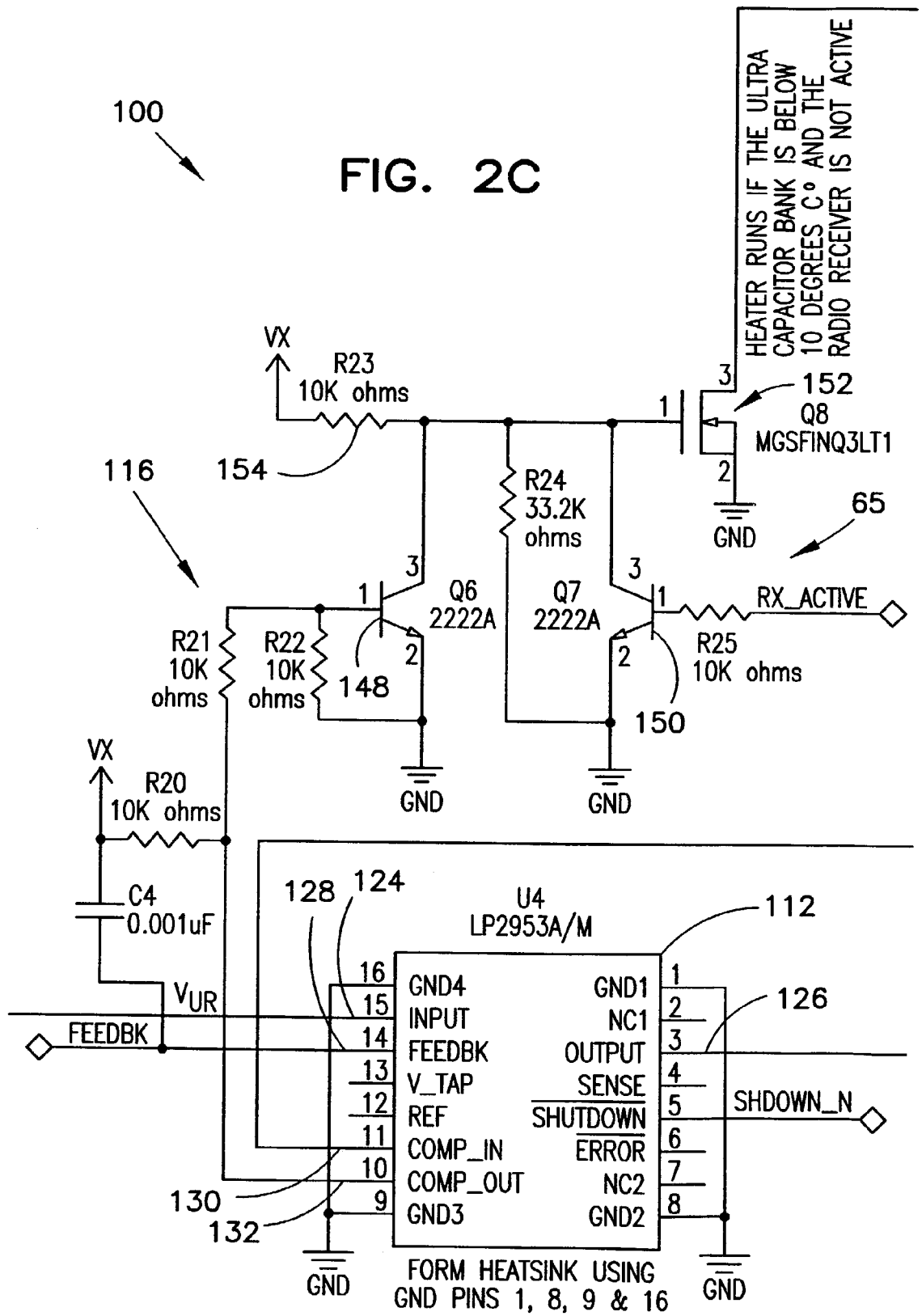
Figure 2D:
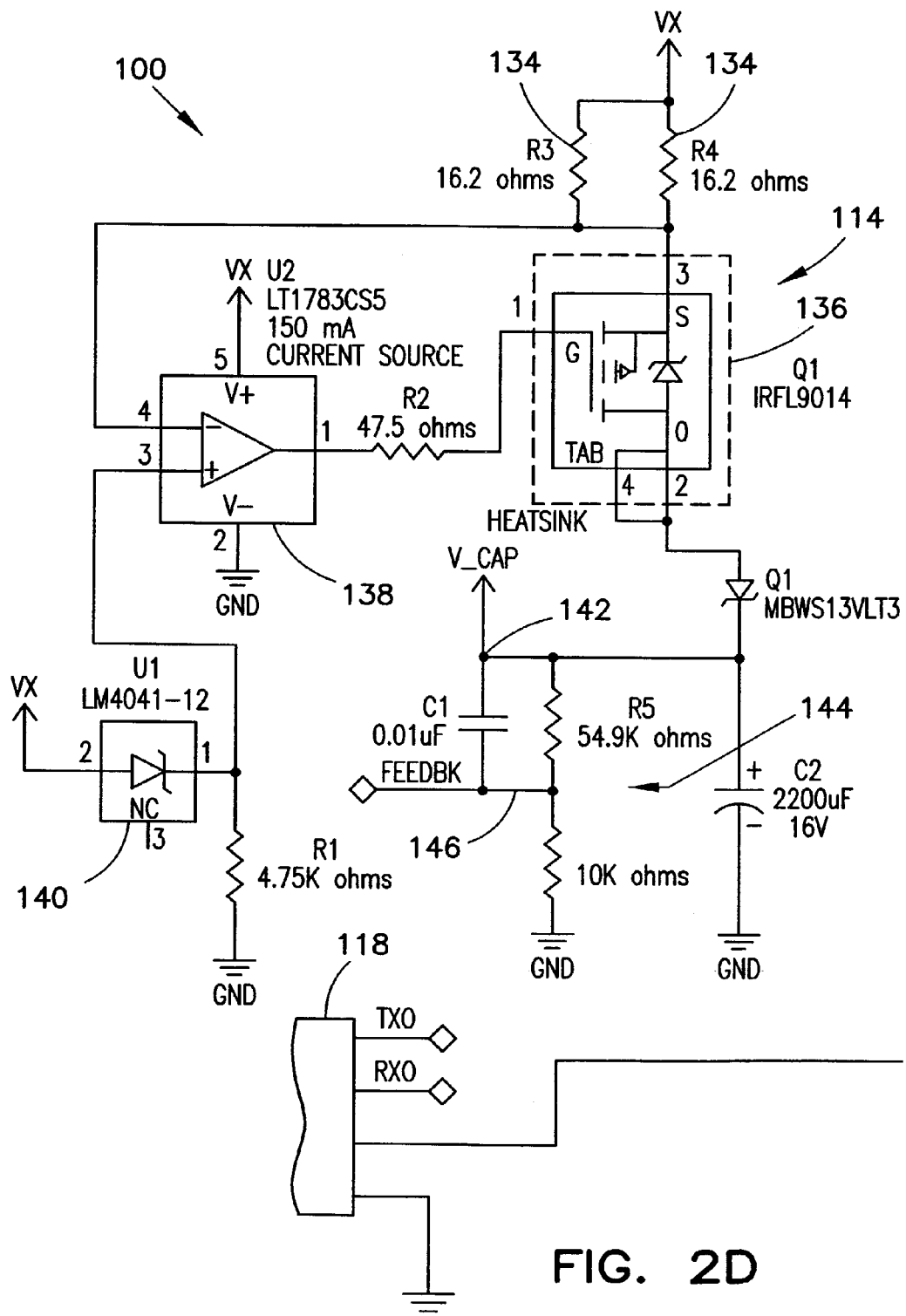

The processing circuitry 65 may suitably be any combination of analog and or digital devices that includes logical elements that provide the functionality described above. The processing circuitry 65 may include distributed devices or circuits, each of which carrying out at least a part of at least one of the above-described functions. By way of example, FIG. 2 shows exemplary processing circuitry that includes elements internal to an RF radio module 110, various discrete transistors, and elements internal to a voltage regulator IC 112. The processing circuitry 65 in other embodiments may comprise an application specific integrated circuit. However, other embodiments may use one or more stand-alone processors, or may employ, at least in part, a processor that performs some of the functions of the measurement circuit 20.

It is noted that the processing circuit 65, the temperature sensor 70 and the heating element 75 preferably cooperate to inhibit operation of the RF transmitter 55 when the temperature is too low, heat the energy storage device 60 to a suitable operating temperature, and then allow the RF transmitter 55 to operate. As a consequence, a variety of auxiliary power sources may be employed in a utility meter, which is often exposed to extremes in temperature not suitable for such power sources. However, it will be appreciated that at least some advantage is provided by merely inhibiting operation of the RF transmitter 55 when the temperature is not within a suitable range, even without coincidentally heating the energy storage device 60. Likewise, it will be appreciated that at least some advantage is provided by heating the energy storage device 60 even if operation of the RF transmitter 55 is not controllably inhibited. In such a case, the heating element 75 could be configured to maintain the temperature of the RF transmitter 55 above a threshold, and the RF transmitter 55 could operate at any time.

In the operation of the meter 10 in FIG. 1, the meter 10 generally operates to measure and register energy consumption data, and from time to time transmit metering data using the RF transmitter 55. The RF transmitter 55 may also from time to time receive RF signals containing meter-related data.

In particular, when electrical power is present (i.e. power is present on the power line ϕC) the meter 10 performs normal metering functions, or in other words, measures a quantity of consumed electrical energy that is conveyed through the power lines ϕA, ϕB and ϕC. To this end, the sensor circuit 15 generates energy consumption signals and provides the energy consumption signals to the measurement circuit 20. The measurement circuit 20 obtains the energy consumption signals and generates metering information therefrom. The metering information, which may for example, include information representative of a quantity of consumed energy in kilowatt-hrs, may then be stored and/or provided to the display 22.

Metering information may also include meter diagnostic information. In particular, from time to time, the measurement circuit 20, which preferably includes meter control circuitry, may perform internal diagnostic tests. Such diagnostic tests may include diagnostics that determine whether the components of the measurement circuit 20, sensor circuitry 15 and/or RF circuit 50 are operating properly. Suitable diagnostic tests for the processors and related circuitry of the measurement circuit 20, sensor circuit 15, and RF circuit 50 are well known, and will vary as a matter of design choice. The results of such diagnostic tests, as with other metering information, may suitably be stored and/or displayed.

During normal operations, the RF circuit 50 periodically communicates metering information to a remotely located central computer. In some cases, the RF circuit 50 may communicate such information to a plurality of remote locations. In any event, to this end, the RF circuit 45 receives the metering information from the measurement circuit 20 and communicates such information to the external network using the RF transmitter 55. The RF transmitter 55 transmits the metering information via radio frequency carrier signals, which are received by corresponding remote RF receiver equipment, not shown.

To this end, the measurement circuit 20 determines from time to time that metering information is to be transmitted via the RF transmitter 55. For example, the measurement circuit 20 may maintain an electronic clock/calendar, and may determine that an RF transmission should take place at certain times and dates. Alternatively, the RF transmitter 55 may receive an RF signal including a metering information request from a remote RF transmitter. Such a request may be communicated to the measurement circuit 20 in any suitable form.

Regardless of what instigates the metering information transmission, the measurement circuit 20 provides the metering data to the RF transmitter 55. Meanwhile, the processing circuitry 65 receives temperature information from the temperature sensor 70. If the temperature information indicates that the ambient temperature in the vicinity of the energy storage device 60 is outside predetermined range, then the processing circuitry 65 inhibits transmission of the metering information by the RF transmitter 55. If, however, the temperature information indicates that the ambient temperature is within a predetermined range, then the processing circuitry 65 does not disable transmission by the RF transmitter 55. As a consequence, the RF transmitter 55 may transmit the metering data to the remote RF receiver, not shown.

In addition, during normal meter operation, the processing circuit 65 also controls operation of the heating element 75 based at least in part on the temperature information. In particular, if the temperature is below a predetermined threshold, then the processing circuitry 65 causes the heating element 75 to be actuated. The actuated heating element 75 generates heat in the vicinity of the energy storage device 60. The processing circuitry 65 then de-actuates the heating element 75 when subsequent temperature information identifies that the ambient temperature exceeds the predetermined temperature. It will be appreciated that the "turn off" temperature should be slightly higher than the "turn on" temperature in order to reduce excessive cycling on and off in the heating element 75.

As a consequence, it will be appreciated that in some circumstances, the processing device 65 could inhibit transmission by the RF transmitter 55 until after the heating element 75 has raised the temperature of the energy storage device 60. However, in other embodiments, the heating element 75 may be activated at a temperature that is above the threshold temperature at which RF transmission is inhibited. In such a case, the heating element 75 could maintain the temperature in the vicinity of the energy storage device 60 at a temperature in which RF transmission will nearly always be enabled. Nevertheless, the processing device 65 may still have the ability to inhibit RF transmission below a certain temperature threshold in the event of extreme conditions in which the heating element 70 is unable to provide adequate heating.

FIG. 2 shows a schematic diagram of an exemplary embodiment of an add-on RF module 100 that may suitably be used as the RF circuit 50 of FIG. 1. The RF module 100 is in the form of a removable module that may be added to existing meter designs. One advantage of forming the RF module 100 as a removable module is that the RF communications may be added as an option to a standard meter design. Accordingly, the need to stock separate, specially designed RF-capable meters is avoided.

In general, the RF module 100 basically may be used with any meter that is capable of communicating data and can provide at least some DC bias power. In the exemplary embodiment described herein, the RF module 100 is configured to be coupled to serial communication lines and unregulated DC bias power through an input connector 118. However, the RF module 100 may readily be adapted to connect to meter control circuitry that uses other data communication formats, as well as other forms of bias power.

In general, the RF module 100 includes a pager radio 110, a voltage regulator integrated circuit ("IC") 112, a regulator control circuit 114, heater logic 116, an energy storage module 120, a divider circuit 122, as well as the input connector 118.

As discussed above, the input connector 118 is operable to connect to a meter circuit to communicate data signals therewith and to obtain bias power therefrom. In the embodiment described herein, the input connector 118 includes four output lines for the following signals, TXO, RXO, VUR and ground. The TXO signal consists of serial data received from the meter circuit to be transmitted by the pager radio 110. The RXO signal consists of serial data to be provided to the meter circuit from the pager radio 110. The VUR signal is the bias power received from the power supply of the meter circuit, which is in reference to the ground.

The voltage regulator IC 112 is a device that receives the VUR signal and generates a regulated voltage therefrom. The voltage regulator IC 112 in the exemplary embodiment described herein is a model LP2953 series voltage regulator available from National Semiconductor. The details of the operation of the LP2953 series voltage regulator are provided in "LP2952/LP2952A/LP2953/LP2953A Adjustable Micropower Low-Dropout Voltage Regulators" (data sheet), National Semiconductor, May, 1999 which is incorporated herein by reference.

The voltage regulator IC 112 has an input 124 connected to input connector 118 to receive the VUR signal therefrom. The voltage regulator IC 112 further includes a regulated output 126 on which is provided the regulated voltage Vx, which is used throughout the RF module 100. The voltage regulator IC 112 also includes a feedback input 128 operably coupled to receive a feedback signal FEEDBK from the regulator control circuit 114, discussed further below.

In general, the voltage regulator IC 112 operates to generate a regulated voltage Vx from the unregulated input voltage VUR. The voltage regulator circuit IC 112 is operable to provide the regulated voltage at an output level controlled in part by the feedback signal FEEDBK. In particular, the voltage regulator IC 112 adjusts the output level of Vx in order to move the FEEDBK signal to a predetermined threshold level. Thus, for example, as long as the signal FEEDBK is below a predetermined level, the voltage regulator IC 112 generates the signal Vx at a relatively high DC voltage level, e.g. 12 volts. When the signal FEEDBK approaches the threshold, the voltage regulator IC 112 reduces the voltage of Vx.

The voltage regulator IC 112 also includes a comparator input 130 and a comparator output 132 which function as part of the heater logic 116, discussed further below. In particular, the packaging of the specific voltage regulator circuit in the IC 112 (the National Semiconductor LP2953 IC) includes an auxiliary comparator circuit which may be accessed through the pins 130 and 132. That comparator circuit is used in the heater logic 116 simply because it happens to be available. As such, the comparator circuit usage in the RF module 100 is largely distinct from the voltage regulator function provided by the voltage regulator IC 112. Accordingly, in other embodiments, a separate comparator circuit may suitably be employed.

In any event, the comparator of the IC 112 operates to provide a high logic voltage signal on the comparator output 132 when the comparator input 130 is above a predetermined threshold. The comparator operates to provide a low logic voltage signal on the comparator output 132 when the comparator input 130 is below a predetermined threshold.

The regulator control circuit 114 includes biasing resistors 134, a power transistor 136, a differential amplifier 138, a voltage reference zener diode 140, an output 142, an output voltage divider 144, and a feedback output 146. The biasing resistors 134 connect Vx to a switched input of the power transistor 136 and to a negative input of a differential amplifier 138. The zener diode 140 provides a reference voltage based on Vx to the positive input of the differential amplifier 138. The output of the differential amplifier 138 is connected to a control input of the power transistor 136.

A switched output of the power transistor 136 is operably connected to the charging output 142. The charging output 142 provides the capacitor charging voltage signal V_CAP thereon. The charging output 142 is also operably connected to provide V_CAP to, among other places, the feedback output 146 via the voltage divider 144. The voltage divided V_CAP signal on the feedback output 146 is the FEEDBK signal. The feedback output 146 is operably connected to provide the FEEDBK signal to the feedback input 128 of the voltage regulator IC 112.

The regulator control circuit 114 operates to provide current control and voltage control of the Vx signal in conjunction with the voltage regulator IC 112. In particular, the regulator control 114 receives as an input Vx at the bias resistors 134, and generates the V_CAP charging current signal therefrom, and further generates the feedback signal FEEDBK.

To this end, the Vx signal flows through the power transistor to the output 142, thus providing charging current on the V_CAP signal through the output 142. The differential amplifier 138 operates to regulate current flow through the power transistor 136 in order to limit the current drawn from the meter power supply. For voltage regulation, it is noted that the voltage of the output 142 (V_CAP) is dictated by the charge level of the energy storage devices 184, discussed below. As discussed above, the FEEDBK signal generated by the regulator control circuit 114 represents a voltage-divided version of V_CAP. Thus, the FEEDBK signal provided to the voltage regulator IC 112 is derived from the charge level of the energy storage devices 184. As a consequence, the level of Vx is dependent in part on the charge level of the energy storage devices 184.

The heater logic 116 includes the comparator circuit, not shown, but which is located within the voltage regulator IC 112 as discussed further above. The heater logic 116 further includes a first transistor switch 148, a second transistor switch 150, a heater switch 152, and a resistor 154 coupled to receive Vx. The first transistor switch 148 is a bipolar junction transistor ("BJT") having a base coupled to the comparator output 132, a collector operably coupled to the resistor 154, and an emitter coupled to ground. The second transistor switch 150 is also a BJT, and has its base coupled to receive an RF active signal RX_ACTIVE from the pager radio 110, its collector operably coupled to the resistor 154, and its emitter coupled to ground. The heater switch 152 is a field effect transistor ("FET") having a gate connected to the resistor 154, a drain coupled to a heater control input 176 of the energy storage module 120, and a source coupled to ground.

The heater logic 116 operates to controllably open the heater switch 152 when either the comparator output 132 is low or the RX_ACTIVE signal is low. If both the comparator output 132 and RX_ACTIVE are high, then the heater logic 116 closes the switch 152. To this end, when the comparator output 132 is high, then the first transistor switch 148 turns on and conducts current from collector to emitter. All of the voltage Vx drops over the resistor 154 and thus the collector voltage of the switch 148 is relatively low. The collector voltage of the switch 148 is also the gate voltage of the heater switch 152. Because the gate voltage of the heater switch 152 is low, the heater switch 152 does not conduct. Similarly, when RX_ACTIVE is high, then the second transistor 150 turns on, thus similarly pulling its collector voltage down towards ground. As with the first transistor switch 148, the collector voltage of the second transistor switch 150 is also the gate voltage of the heater switch 152. Thus, the low collector voltage of the second transistor switch 150 causes the heater switch 152 to be open.

However, if RX_ACTIVE is low and the comparator output 132 is low, then neither of the transistors 148 or 150 are turned on. As a result, insufficient current is present to allow Vx to drop significantly over the resistor 154, and the collector voltages of the transistors 148 and 150 will be relatively high. Because the collector voltages of the transistors 148 and 150 are the same as the gate voltage of the heater switch 152, a high signal is provided to the gate of the heater switch 152. The high voltage signal at the gate of the heater switch causes the heater switch 152 to close (i.e. turn on, or conduct current).

The voltage divider circuit 122 includes a plurality of resistors and a temperature sense input 156, a first temperature sense output 158, and a second temperature sense output 160. The temperature sense input 156 is coupled to the sensor input 178 of the energy storage module 120. The first temperature sense output 158 is coupled to the comparator input 130 of the heater logic 116 (in the voltage regulator IC 112). The second temperature sense output 160 is coupled to an analog voltage input 170 of the pager radio 110. The voltage divider circuit 122, as will be discussed below, provides a biasing signal to the temperature sensor 186 (See FIG. 3) and adjusts the output signal of the temperature sensor 186 for use by the heater logic 116 and the pager radio 110.

The pager radio 110 is an integrated radio circuit device that includes both RF transmission circuitry and digital processing circuitry. The radio module 110 in the exemplary embodiment described herein is a pager device, preferably a Motorola ReFlex50 pager radio. The pager radio 110 includes a transmission input 162 operably coupled to receive the TXO signal from the input connector 118, a reception output 164 operably coupled to provide the RXO signal to the input connector 118, a power input 166 coupled to receive V_CAP, an RF active output 168 operable to provide RX_ACTIVE signal, and an analog input 170 operably coupled to the second temperature sense output 160. The pager radio 110 further includes an antenna 172.

The pager radio 110 is operable to receive the signal TXO from the input 162 and transmit an RF signal via the antenna 172 that incorporates the information from the TXO signal therein. The pager radio 110 is further operable to receive an RF signal via the antenna 172 that contains digital data and produce the RXO signal containing the digital data at the output 164. The pager radio 110 is also operable to provide a high logic signal at its RF active output 168 when the pager radio 110 is either transmitting or receiving RF signals. The pager radio 110 is further operable to inhibit RF transmission when the signal at the analog voltage input 168 falls below a predetermined threshold.

The pager radio 110 obtains power for the RF transmission, RF reception, and other operations from the V_CAP signal at the power input 166.

Figure 3:
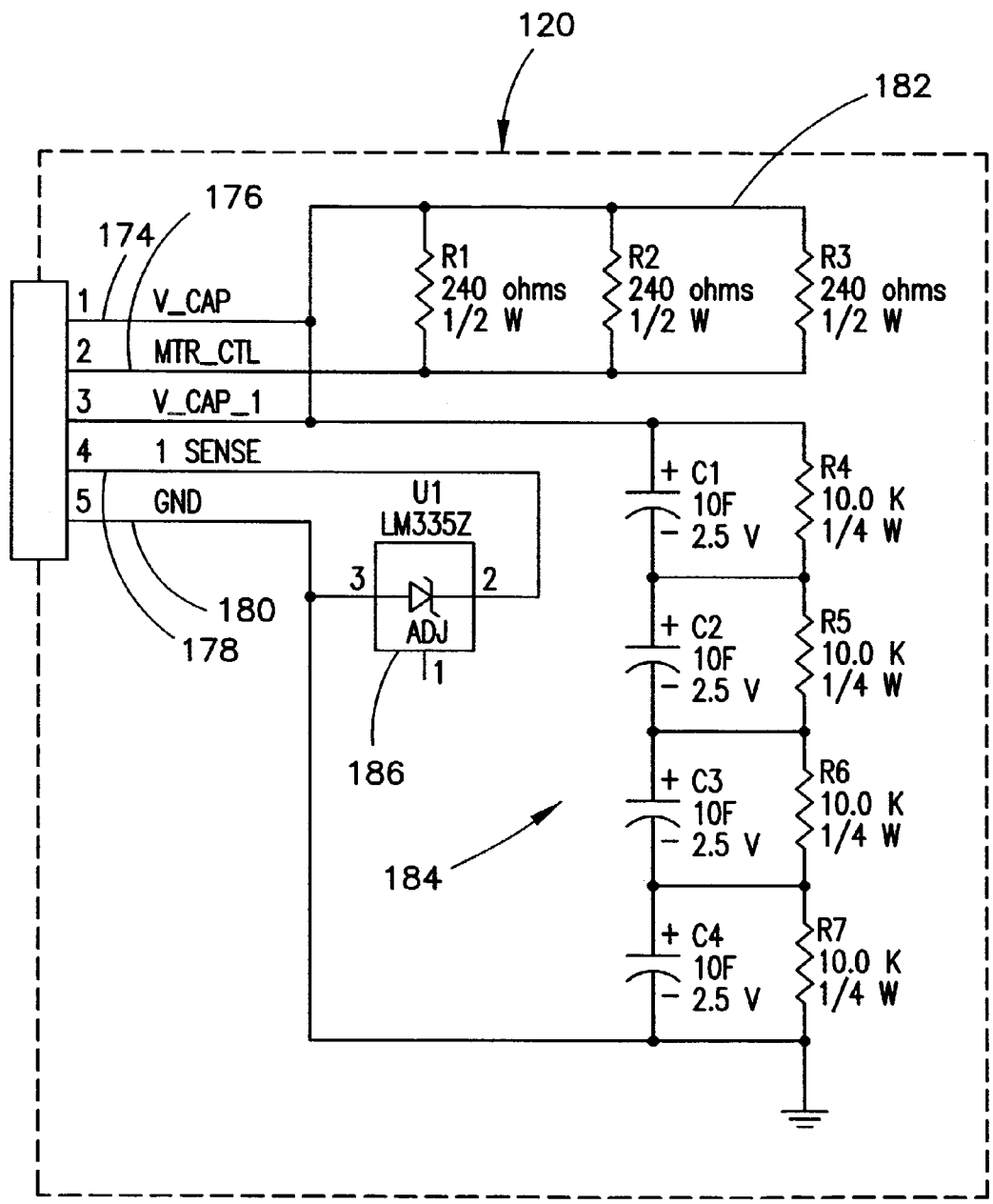
FIG. 3 shows a schematic diagram of the energy storage module of FIG. 2.

FIG. 3 shows in further detail the energy storage module 120. Referring simultaneously to FIGS. 2 and 3, the energy storage module 120 is a circuit module having a capacitor voltage input 174 that carries the V_CAP signal, a heater input 176, a sensor input 178, a ground connection 180, a heater circuit 182, an energy storage circuit 184, and a temperature sensor 186.

The energy storage circuit 184 is a set of four series connected capacitors C1, C2, C3, and C4 connected in parallel with a set of four series resistors R4, R5, R6 and R7. The capacitors C1, C2, C3 and C4 are preferably ultracapacitors, described further above, which are 10 farads each with a capacity of 2.5 volts. The energy storage circuit 184 is coupled between the voltage input 174 and the ground input 180.

When the voltage V_CAP at the voltage input 174 exceeds the voltage across the energy storage circuit 184, current flows through the resistors R4, R5, R6 and R7 and contemporaneously charges the capacitors C1, C2, C3 and C4. When the capacitors C1, C2, C3 and C4 are fully charged, the voltage V_CAP does not significantly exceed the voltage across the energy storage circuit 184, and relatively little current flows into the energy storage circuit 184. If a discharging current draw is present on the voltage input 174 (i.e. V_CAP is powering the pager radio 110), then the capacitors C1, C2, C3 and C4 discharge through the voltage input 174, thereby providing current on V_CAP. The capacitors C1, C2, C3 and C4 are capable of providing up to 2 amperes of current for a few seconds when fully charged.

The heater circuit 182 comprises a plurality of parallel connected resistors and is connected between the voltage input 174 and the heater input 176. If the heater input 176 is connected to ground, or another voltage lower than V_CAP, then current will flow from the voltage input 174 to the heater input 176, thereby causing the resistors to drop voltage and dissipate energy in the form of heat. The heater circuit 182 is disposed in a heat transfer relationship with the capacitors C1, C2, C3 and C4.

The temperature sensor 184 is an active semiconductor device that provides a variable resistance or voltage drop that is based on the ambient temperature. The temperature sensor 184 is coupled between the sensor input 178 and the ground input 180.

In operation, the RF module 100 has various modes or states. In a first state, no RF communications are pending or taking place. In another state, an RF signal is being transmitted and/or received by the pager radio 110.

During the first or idle state, the elements of the RF module 100 operate to charge and/or maintain the charge of the energy storage circuit 184. To this end, power from the meter power supply is received on the VUR signal via the input connector 118. The input connector 118 provides the VUR signal to the voltage regulator IC 112. The voltage regulator IC 112 provides an output voltage Vx having a magnitude controlled in part by the FEEDBK signal received at the feedback input 128.

In general, the FEEDBK signal is representative of the charge level of the energy storage circuit 184. As discussed above, the charge level of the energy storage circuit 184 is defined by V_CAP, which is present on the output 142 of the regulator control circuit 114. As also discussed above, the FEEDBK signal on the feedback output 146 is merely a voltage-divided version of V_CAP, and thus represents the charge level of the energy storage circuit 184.

When the energy storage circuit 184 is not at full charge, i.e. V_CAP is below eight volts, the FEEDBK signal will be sufficiently low so as to cause the voltage regulator IC 112 to generate a Vx signal of approximately 12 volts. However, if the energy storage circuit 184 is at or near full charge, then the FEEDBK signal is sufficiently high so as to cause the voltage regulator IC 112 to generate a Vx signal of about eight volts.

The Vx signal passes through the bias resistor 134 and the power transistor 136 of the regulator control circuit 114 to the output 142. Thus, if V_CAP (i.e. the charge level of the energy storage circuit 184) is low, and Vx is relatively high (i.e. 12 volts), then more current will tend to flow out of the output 142 into the voltage input 174 of the energy storage module 120. The resulting current flow charges the capacitors C1, C2, C3 and C4. However, the differential amplifier 138 and the power transistor 136 cooperate to limit the current flow from regulated output 126 (i.e. Vx) to the output 142 (i.e. V_CAP). The current flow is limited in order to limit the current draw on the meter power supply via VUR.

Referring again to the general charging operation, if the energy storage circuit 184 is nearly fully charged, then V_CAP will be nearly eight volts, as will Vx. As a result, little voltage can drop over the bias resistor 134 and little or no current is developed for charging the energy storage circuit 184.

Thus, in a first mode of operation where no RF communication takes place, the voltage regulator IC 112 and the regulator control circuit 114 cooperate to charge the energy storage circuit 184 (using limited current) until the energy storage circuit 184 is charged to about eight volts.

In addition, during the first mode of operation, elements of the RF module 100 attempt to control the ambient temperature of the energy storage circuit 184 to attempt to prevent the ambient temperature from falling below a predetermined temperature, for example, approximately 12–15° F.

Specifically, as temperature decreases, the temperature sensor 186 provides less resistance, and thus drops less voltage. As a consequence, the voltage level at the first temperature sense output 158 decreases as the temperature decreases. When the temperature falls below the predetermined temperature threshold, then the voltage at the first temperature sense output 158 will be below a corresponding threshold of the comparator of the heater logic 116. The temperature sense output 158 provides the low voltage level to the comparator input 130. Because the voltage is below the comparator threshold, the comparator output 132 provides a low logic output. The low logic output is provided to the base of the first transistor switch 148. The low logic output is insufficient to turn on the first transistor switch 148. Contemporaneously, because no RF communication is occurring, the pager radio provides a low logic signal as the RX_ACTIVE signal from its output 168. The low logic RX_ACTIVE signal is provided to the base of the transistor switch 150, and fails to turn on the switch 150. As a consequence, little or no current can flow through the resistor 154 and the voltage at the collectors of the switches 148 and 150 and the gate of the heater switch 152 will rise to approximately Vx.

The high voltage at the gate of the heater switch 152 causes the heater switch 152 to conduct. When the heater switch 152 conducts, the circuit is completed from V_CAP to ground through the heater circuit 182. As a consequence, current flows through the heater circuit 182, causing the heater circuit 182 to generate heat in the vicinity of the energy storage circuit 184.

Contrariwise, if the ambient temperature is above the predetermined threshold, then the temperature sensor 186 becomes more resistive or at least drops more voltage. As a consequence, the voltage at the first temperature sense output 158 increases to a level above the comparator threshold. The increased voltage is provide to the comparator input 130. Because the voltage at the comparator input 130 is above the threshold, the comparator output 132 provides a high logic signal to the base of the first transistor switch 148. The high logic signal at the base of the switch 148 causes the switch 148 to turn on. When the switch 148 is turned on, current flows through the resistor 154, thereby lowering the collector voltage of the switch 148, as well as the gate voltage of the heater switch 152. The low gate voltage causes the heater switch 152 to stop conducting, thereby opening (and deactivating) the heater circuit 182.

If, despite the above-described operation of the heater circuit 182, the temperature reaches another low threshold below which operation of the energy storage circuit 184 could damage the energy storage circuit 184, then the elements of the RF module operate to inhibit any future RF communication until the ambient temperature rises to an acceptable level. Inhibiting RF communication protects the energy storage circuit 184 from operating in the extreme cold conditions.

To this end, when the temperature sensor 186 is exposed to a low enough temperature, the voltage at the second temperature sense output 160 falls below a RF suppression threshold stored within the pager radio 110. The second temperature sense output 160 provides the low voltage to the analog input 170 of the pager radio 110. The pager radio 110 determines that the input voltage is lower than the RF suppression threshold and then suppresses any further RF communications.

When the temperature is above the threshold, which may suitably be 10° F. in this embodiment, then the temperature sensor 186 drops more voltage, and the voltage level of the second temperature sense output 160 rises to above the RF suppression threshold. The pager radio 110 receives the voltage level from the second temperature sense output 160 and determines that it is above the RF suppression threshold. In response to such determination, the pager radio 110 does not suppress further RF communications.

Thus, in the exemplary embodiment described herein, the first mode of operation (when no RF communications take place) involves charging and maintaining the charge of the energy storage circuit 184, obtaining temperature measurements and heating the energy storage circuit 184 and/or suppressing any potential RF communications based on the measured temperature.

In the second mode of operation, the RF module 100 operates to perform RF communication either by receiving RF signals at the antenna 172, transmitting RF signals from the antenna 172, or both. In particular, the input connector 118 from time to time receives a serial data signal TXO from the meter measurement and/or control circuit, not shown. The pager radio 110 receives the TXO signal at the input 162 and formulates and transmits and RF signal containing data from the TXO signal via the antenna 172. Likewise, from time to time the pager radio 110 may receive data modulated on an RF signal via the antenna 172. The pager radio 110 extracts the data and provides it on the output 164 as the serial data signal RXO. The RXO signal is provided to the meter measurement/control circuit via the input connector 118.

During either reception or transmission of RF signals, the pager radio 110 provides a high logic RX_ACTIVE signal on its output 168. The high logic RX_ACTIVE signal turns on the second transistor switch 150, thereby effectively preventing the heater switch 152 from closing. As a result, the heater circuit 182 never operates when RE communication is occurring. The operation of the heater circuit 182 is suppressed during RF communication in order to conserve available power for the RF communication.

RF transmission by the pager radio requires up to two amperes of current. Providing such current directly from the meter power supply would require that the meter have a much larger power supply than that which is typically employed in an electronic utility meter. According to one aspect of the invention, the energy storage circuit 184 serves as an auxiliary power source that provides the transmission current via V_CAP on the input 166 of the pager radio 110. The energy storage circuit 184 provides the current for a long enough interval to allow the RF communication transaction to take place.

Figure 4:
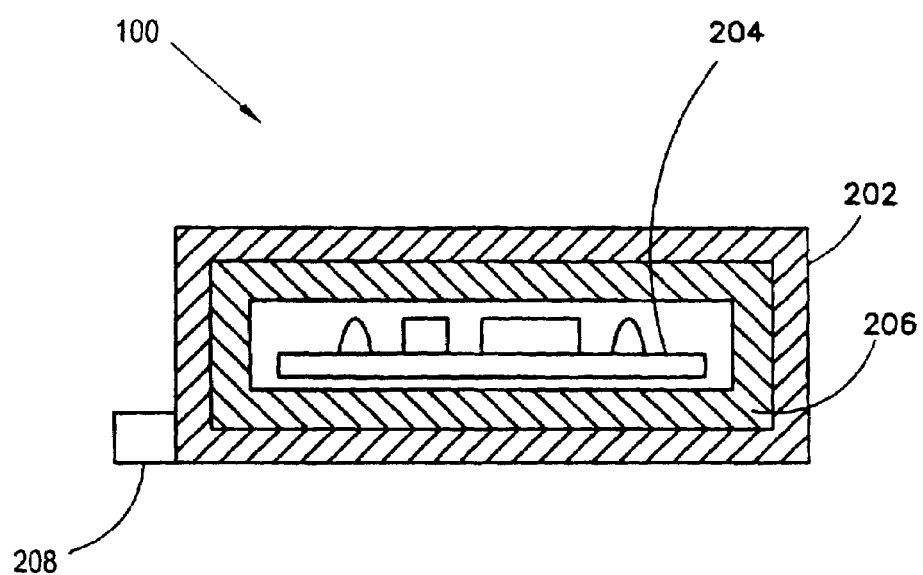
FIG. 4 shows a cutaway view of an exemplary embodiment of the energy storage module of FIG. 3.

It is noted that the operation of the RF module 100 of FIGS. 2 and 3 includes various methods of avoiding operation of the energy storage circuit 184 when the ambient temperature is exceedingly low. In addition to the circuit-based protections, it may be advantageous to provide an insulated compartment for the RF module 100. For example, FIG. 4 shows an exemplary embodiment of the RF module 100 that includes a housing 202, a circuit board 204 disposed within the housing 202, and an insulating layer 206 disposed at least in part between the housing 202 and the circuit board 204. The circuit board 204 preferably includes the elements shown in FIG. 3. The housing 202 may take any suitable shape, as may the insulating layer 206. In some cases, the housing 202 and the insulating layer will be the same element. The housing 202 also includes a connector 208 secured thereto that includes the inputs 174, 176, 178 and 180.

In any event, the housing 202 and insulating layer 206 help trap heat in the immediate vicinity of the circuit board 204. The thermal protection assists in maintaining the ambient temperature of the energy storage circuit 184 at an acceptable level.

As discussed above, the above described circuit of FIGS. 2 and 3 may readily be adapted for nearly any utility meter, and particularly electronic utility meter, that can communicate using data signals and includes a bias power supply for normal metering operations. Non-limiting examples of meters in which this device may be used is described in U.S. Pat. No. 6,043,642 and U.S. Pat. No. 6,112,158, which are incorporated herein by reference.

It will be appreciated that the above described embodiments are merely illustrative, and that those of ordinary skill in the art may readily devise their own implementations that incorporated the principles of the present invention and fall within the spirit and scope thereof.

I claim:

1. An arrangement for providing power in a utility meter, the utility meter including a radio frequency transmitter, the arrangement comprising:
   a power conversion circuit operable to provide power to metering circuitry within the utility meter, the power conversion circuit having a maximum output current;
   a bank of capacitors operably coupled to a power supply input of the radio frequency transmitter, the bank of capacitors configured to provide current in excess of the maximum output current during transmission by the radio frequency transmitter to supply power to the radio frequency transmitter.

2. The arrangement of claim 1 wherein the power conversion circuit is further operably coupled to provide a charging current to the bank of capacitors.

3. The arrangement of claim 1 wherein the bank of capacitors include ultracapacitors.

4. The arrangement of claim 3 wherein the ultracapacitors comprise double-layer capacitors having metal carbon electrodes and a non-aqueous electrolytic solution.

5. The arrangement of claim 1 wherein the power supply further comprises a temperature sensor disposed proximate the bank of capacitors, the temperature sensor operable to generate a temperature output signal having temperature information therein.

6. The arrangement of claim 5 further comprising a processing circuit coupled to receive the temperature information of the temperature output signal, the processing circuit operable to inhibit transmission by the radio frequency transmitter based on the temperature information.

7. The arrangement of claim 5 further comprising:
   a heat generating element disposed proximate the bank of capacitors, the heat generating element configured to increase the ambient temperature of the bank of capacitors above a threshold operating temperature;
   a processing circuit coupled to receive the temperature information of the temperature output signal, the processing circuit operable to cause operation of the heat generating element based on the temperature information.

8. The arrangement of claim 1 further comprising a heat generating element disposed proximate the bank of capacitors, the heat generating element configured to increase the ambient temperature of the bank of capacitors above a threshold operating temperature.

9. An arrangement for transmitting information from a utility meter, the arrangement comprising:
   a radio frequency transmitter operable to transmit metering information;
   an energy storage circuit operably coupled to a power supply input of the radio frequency transmitter, the energy storage circuit configured to provide power the radio frequency transmitter;
   a temperature sensor disposed proximate the energy storage circuit, the temperature sensor operable to generate a temperature output signal having temperature information therein; and
   processing circuitry operably coupled to receive the temperature information, the processing circuitry operable to inhibit operation of the radio frequency transmitter based at least in part on the temperature information.

10. The arrangement of claim 9 wherein the processing circuitry is further operable to inhibit operation of the radio frequency transmitter when the temperature information is indicative of a temperature in the proximity of the energy storage circuit below a predetermined threshold.

11. The arrangement of claim 9 wherein the radio frequency transmitter comprises a pager radio.

12. The arrangement of claim 9 further comprising a heat generating element disposed proximate the bank of capacitors, and wherein the processing circuitry is further operably connected to activate the heat generating element responsive to the temperature information.

13. The arrangement of claim 9 wherein the energy storage circuit further comprises a plurality of capacitors.

14. The arrangement of claim 13 wherein the plurality of capacitors includes ultracapacitors.

15. The arrangement of claim 9 wherein the processing circuitry includes elements of a pager radio integrated circuit and elements of a voltage regulator integrated circuit.

16. An arrangement for operating a circuit in a utility meter, the arrangement comprising:
   a first circuit performing an operation in a utility meter; and
   a heat generating element disposed proximate the first circuit, the heat generating element configured to be controllably activated to increase the ambient temperature proximate the first circuit.

17. The arrangement of claim 16 further comprising a processing circuit operably coupled to controllably activate the heat generating element.

18. The arrangement of claim 17 wherein the processing circuit is further operable to controllably activate the heat generating element based on temperature information.

19. The arrangement of claim 16 further comprising:
   a temperature sensor disposed proximate the first circuit, the temperature sensor operable to generate a temperature output signal having temperature information therein; and processing circuitry operably coupled to receive the temperature information, the processing circuitry operable to controllably activate the heat generating element based at least in part on the temperature information.

20. The arrangement of claim 16 wherein the first circuit further comprises an energy storage element.

21. A method of controlling a transmission operation in a utility meter, comprising:
   a) obtaining temperature information representative of a sensed temperature proximate an energy storage element;
   b) inhibiting operation of a first circuit, the first circuit performing an operation in the utility meter responsive to the temperature information;
   c) activating a heater element proximate the first circuit;
   d) obtaining subsequent temperature information after activating the heater element, the subsequent temperature information representative of a subsequent sensed temperature proximate the energy storage element.
   e) enabling operation of the first circuit responsive to the subsequent temperature information.

* * * * *